United States Patent Office 3,481,859
Patented Dec. 2, 1969

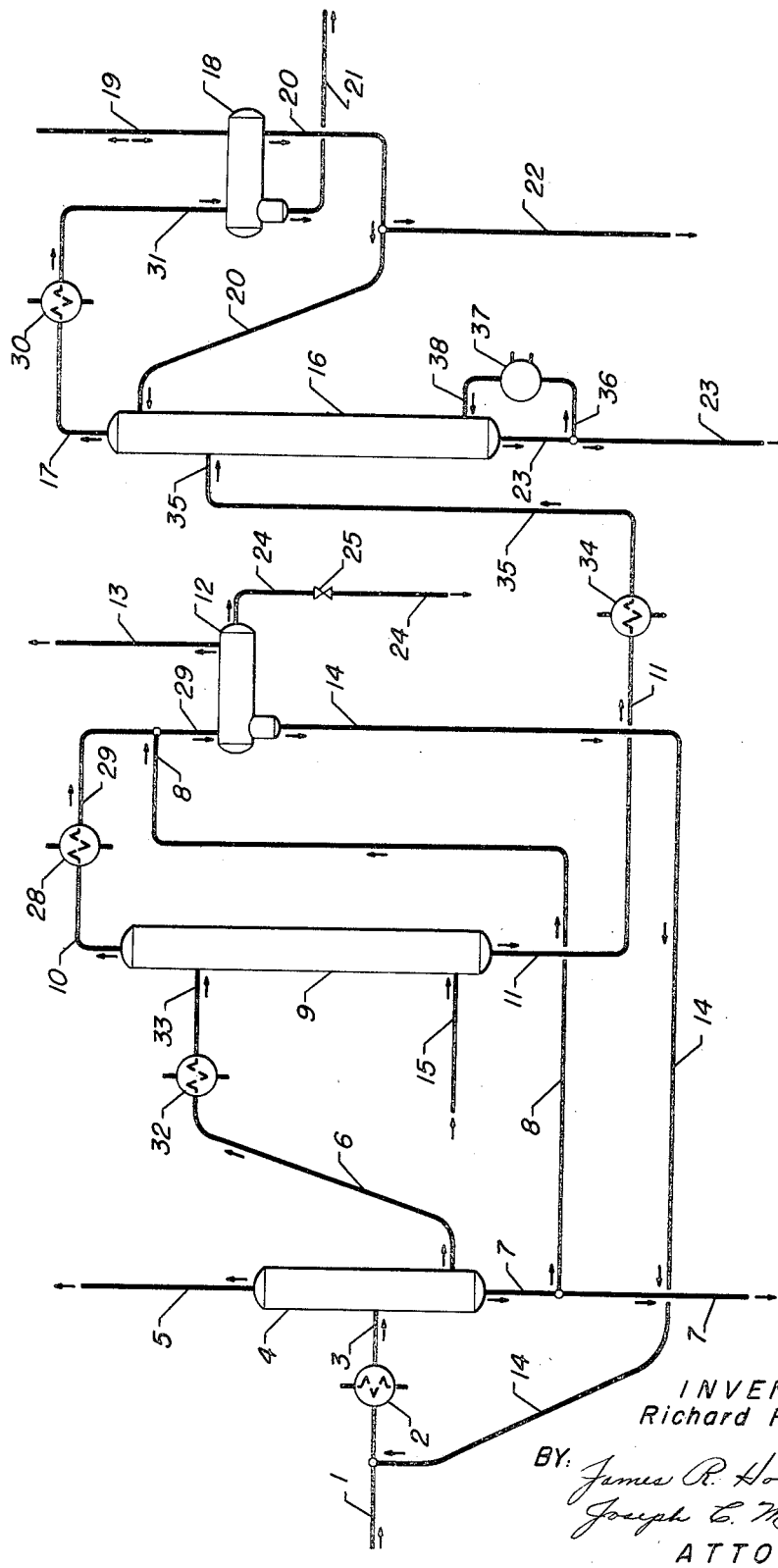

3,481,859
SEPARATION OF A REACTION EFFLUENT CONTAINING CONSTITUENTS SUBJECT TO THERMAL DEGRADATION
Richard R. De Graff, Arlington Heights, Ill., assignor to Universal Oil Products Company, Des Plaines, Ill., a corporation of Delaware
Filed Apr. 13, 1966, Ser. No. 542,334
Int. Cl. C10g 37/00, 31/14; B01d 3/38
U.S. Cl. 208—102                                       10 Claims

ABSTRACT OF THE DISCLOSURE

Process for separation of an effluent from a reaction zone wherein a hydrocarbon charge stock has been contacted with a gaseous reactant and where the effluent contains thermally unstable liquid constituents, corrosive normally gaseous constituents, and hydrocarbon insoluble constituents. The process comprises a method of steam stripping of the effluent wherein at least a part of the resulting steam condensate is passed to the reactor effluent cooler in admixture with the effluent. The process has particular application to the separation of hydrotreating and hydrocracking reactor effluents.

---

The present invention relates to a process for the separation of thermally unstable organic chemicals. In particular, the present invention relates to the separation of a hydrogen treated hydrocarbon stream which is thermally unstable in subsequent distillation means. Most specifically, the present invention relates to the separation of a hydogen treated hydrocarbon stream which contains insoluble inorganic contaminants and which is thermally unstable in subsequent distillation means.

Hydrogen treatment of contaminated hydrocarbon charge stocks is well known in the art of hydrocarbon processing and a typical method is shown in U.S. Letters Patent No. 2,878,180. Hydrogen treatment saturates the olefinic constituents of the stock and removes sulfur, nitrogen, chlorine, and other inorganic contaminants by hydrogenation. Hydrogen treatment also serves to remove trace quantities of arsenic, lead, copper, nickel, vanadium, tungsten, and other metals which may be present in untreated hydrocarbon fractions and which may be detrimental in subsequent processing operations or to final product use. The purification is effected by passing the hydrocarbon charge in admixture with hydrogen into the presence of a suitable catalyst at a pressure of from about 100 p.s.i.g. to about 1000 p.s.i.g., the operating pressure being dependent upon the composition or type of charge stock being processed. The hydrogen not only serves as a reactant in effecting the purification of the hydrocarbons, but it also affords a method for protecting the catalyst against excessive carbonization by providing a thermal sink for exothermic heat of reaction. Hydrogen is, therefore, normally present at a concentration of from about 100 standard cubic feet per barrel (s.c.f.b.) of hydrocarbon charge to about 3000 s.c.f.b., the amount again being dependent upon the type of charge stock being processed. The temperature of the hydrogen treating reaction zone is maintained in the range from about 500° F. to about 900° F. The actual temperature required will necesarily vary in accord with the degree of contamination, the type of stock being processed, and with the activity level of the catalyst. The hydrocarbon is normally processed at a liquid hourly space velocity in the range of about 1.0 to about 10.0. A suitable catalyst for such hydrogen treating of hydrocarbons comprises alumina, silica and a Group VIII metal or a Group VI–B metal or any combination of metals thereof. The metals of Groups VI–B and VIII are intended to include those indicated in the Periodic Chart of the Elements, Fisher Scientific Company, 1953. A more preferred catalyst is comprised of alumina, silica, nickel, molybdenum, and cobalt wherein the metals may be specifically present as the oxides or sulfides. A typical catalyst comprises 4.20 wt. percent nickel, 11.3 wt. percent molybdenum, 0.05 wt. precent cobalt, 10.13 wt. percent silica, and 74.32 wt. percent alumina.

The effluent mixture from the hydrogen treating reactor leaves at elevated temperature and contains dissolved normally insoluble inorganic constituents. Upon subsequent cooling in an effluent exchanger these constituents may deposit in the exchanger and cause reduced heat transfer rates and excess pressure drop. The major constituents of such deposits are ammonium chloride and ammonium polysulfides, and it is, therefore, common in the art to inject steam condensate into the effluent mixture before the exchanger in order to afford a method of washing such deposits out of the system. The condensate injection rate is preferably equivalent to at least 3 vol. percent of the liquid hydrocarbon contained within the effluent stream. This rate not only provides a sufficiency of water to dissolve the hydrocarbon insoluble constituents, but it assures that there will be intimate mixing of hydrocarbon and water and that there will be sufficient water to wash out any other surface deposits. The cooled effluent then passes into a high pressure separator wherein a hydrogen containing vapor phase, a liquid hydrocarbon phase and an aqueous phase are maintained at the pressure of the reactor system. The aqueous phase containing the dissolved inorganic constituents is discarded, while at least a part of the hydrogen containing vapor phase is withdrawn as a product stream, and another part of the hydrogen containing vapor phase is normally recycled to the reactor system. The liquid hydrocarbon phase is withdrawn from the high pressure separator and sent to a low pressure separator, which is maintained normally at a pressure in the range of 100 p.s.i.g. to 200 p.s.i.g. A substantial amount of dissolved gaseous vapor comprising hydrogen and hydrogen sulfide is released from the hydrocarbon liquid therein and is recovered for use as a fuel or for further processing. The hydrocabon phase is then withdrawn and introduced into a fractionation system in order to remove the substantial amount of gas which still remains dissolved therein due to the elevated pressure of the low pressure separator and in order to effect the desired specifications on the treated hydrocarbon.

The dissolved gas comprises hydrogen, methane, ethane, and other combustible products, and the fractionation is normally undertaken at elevated pressure in order that the gas may be injected directly into the fuel gas system of the refinery. Similarly, where the concentration of hydrogen sulfide in the gas is high, it is often the art to process such gas to recover elemental sulfur as a desired refinery product and fractionation at elevated pressure is preferred in order that the gas product may be sent directly to the sulfur recovery unit without intermediate compression. Because of the elevated pressure on the system, the boiling points of the hydrocarbon constituents are elevated and the fractionation column must be made of alloy metals in order to resist corrosion which is caused by the presence of substantial amounts of hydrogen sulfide, traces of moisture, traces of hydrogen chloride, and other corrosive products at these elevated temperatures. The use of alloy metals is undesirable since it entails greater capital expense.

The most important disadvantage to operating the fractionation means at elevated pressure is that many hydrocarbon constituents are unstable at the temperatures which are required for vaporization of the hydrocarbon at the elevated pressure. Thus, where the hydrocarbon comprises a kerosene product to be used as a luminant, overheating of the product will cause slight decomposition resulting in a darkening of the kerosene, which may cause difficulty in meeting the color specification of the liquid product. Similarly, many lubricating oils must meet a color specification and are often discolored by fractionation at elevated temperatures. Experience has also shown that many hydrocarbon products will undergo substantial thermal cracking under such conditions. This cracking, being experienced with kerosenes, gas oils, diesel oils, and lubricating oils, not only results effectively in a yield loss, but it causes difficulty in meeting flash points because the cracking is continually generating lower boiling constituents. A further detriment is experienced where the hydrocarbon has been hydrogenated in order to eliminate olefins and prepare the hydrocarbon as the charge to a normal paraffin recovery process, wherein molecular sieves are the means of separation. A typical example of such a separation process is disclosed by D. B. Broughton et al. in U.S. Patent No. 2,985,589. The cracking of the stock during fractionation at elevated pressure will form traces of olefinic hydrocarbons. When such a cracked product is charged to the bed of high surface molecular sieves, the olefins are polymerized therein and the resulting polymers accumulate upon the surface and in the pores of the molecular sieves causing premature loss of sieve capacity and separation efficiency.

Where thermally unstable constituents are contained in the hydrogen treated hydrocarbon, it is therefore necessary to operate the subsequent distillation means at substantially atmospheric pressure or under vacuum in order to maintain the temperature of the distillation means below the level of thermal instability of such constituents. Since the hydrocarbon leaving the low pressure separator contains a considerable quantity of dissolved gas, operation of the subsequent distillation means at substantially atmospheric pressure or under vacuum will necessitate increased column diameters and vapor line diameters due to the increased volume which the gas will occupy at the reduced pressure. Since the dissolved gas must now be recovered at a low pressure, vacuum pumps and compressors are necessary in order that the gas may be raised in pressure for injection into the fuel gas system or for delivery to the sulfur recovery unit. Since the recovered gas contains traces of moisture, traces of hydrogen chloride, and substantial amounts of hydrogen sulfide, the required vacuum pumps and compressors must be manufactured of corrosion resistant alloys. Experience has shown that despite the alloy construction of such compression equipment, under some conditions of service excessive maintenance is still required to keep the compression equipment in operation. Thus, while distillation of the hydrogen treated product under reduced pressure will eliminate the danger of thermal decomposition, it has the disadvantage of requiring excessive capital and operating expense.

It is therefore the object of this invention to provide a means whereby the effluent from a hydrogenation reaction zone which contains thermally unstable constituents and corrosive normally gaseous constituents may be separated at a temperature below the level of instability of such unstable constituents. It is a further object of this invention to provide a means whereby the effluent from a hydrogenation reaction zone which contains thermally unstable constituents and corrosive normally gaseous constituents may be effectively separated at a temperature below the level of thermal instability of the unstable constituents in such a manner that the gas may be recovered without the use of compressor means. It is a more specific object of the present invention to provide a means whereby the effluent from a hydrogenation reaction zone which comprises thermally unstable constituents, hydrocarbon insoluble constituents, and corrosive normally gaseous constituents, may be effectively separated at a temperature below the level of thermal instability of said unstable constituents in such a manner that the gas may be recovered without the use of compressor means while simultaneously affording a means for removal of said hydrocarbon insoluble constituents.

Therefore, in accordance with the practice of this invention, a broad embodiment thereof comprises a process for separating an effluent from a reaction zone wherein a hydrocarbon charge stock has been contacted with a gaseous reactant, said effluent containing thermally unstable constituents, hydrocarbon insoluble constituents, and corrosive normally gaseous constituents, which comprises the steps of: injecting a hereinafter specified aqueous stream into the effluent leaving said reaction zone and passing the resulting first mixture into a separator wherein a first aqueous phase containing said hydrocarbon insoluble constituents, a first liquid hydrocarbon phase, and a first gaseous vapor phase are separated; withdrawing from the separator said first aqueous phase as a product stream, and said first gaseous vapor phase containing a portion of said corrosive constituents as a product stream; passing said first liquid hydrocarbon phase from the separator to a stripping column wherein open steam is injected as a stripping medium at a temperature below the level of instability of said thermally unstable constituents; removing from the stripping column an overhead stream comprising gases, steam, and light hydrocarbon vapors and collecting the resulting second mixture in an overhead receiver under conditions sufficient to separate said mixture into a second gaseous vapor phase, a second liquid hydrocarbon phase, and a second aqueous phase; withdrawing said second gaseous vapor phase containing substantially all of the remaining corrosive constituents as a product stream; recycling at least a portion of said second aqueous phase from the receiver and into the effluent as hereinabove specified; removing a hydrocarbon stream comprising said thermally unstable constituents from the stripping column and passing said hydrocarbon stream to subsequent distillation means wherein the operating pressure is maintained at a level sufficient to provide that the temperature of distillation is below the level of thermal instability of said constituents; and withdrawing from said distillation means a hydrocarbon product comprising said thermally unstable constituents.

The process of the present invention may be more clearly understood by reference to the accompanying figure which consists of a schematic flow diagram illustrating a preferred embodiment thereof. Various pumps, heat exchangers, valves, control instruments, etc. have been eliminated in order to clarify the drawing and thus implement the complete understanding of the inventive process since the utilization of these and other miscellaneous appurtenances will be immediately recognized by those skilled in the art.

Now referring to the figure, a straight run diesel oil has been hydrogen treated according to well known prior art procedures to reduce its sulfur content from 1.50 wt. percent to 0.25 wt. percent and it is required that the final product have a flash point of 160° F. (ASTM Method D-93) and an ASTM color of less than 1.5 (ASTM Method D-1500). Upon leaving the reactor system and upon subsequent heat exchange, the reactor effluent enters the process of the present invention via line 1 at a temperature of 265° F. and a pressure of p.s.i.g. The effluent contains 589,000 standard cubic feet per day of hydrogen sulfide and comprises 7247 barrels per stream day (b.p.s.d.) of liquid hydrocarbon and $8.27 \times 10^6$ standard cubic feet per day (s.c.f.d.) of gaseous vapor. The effluent is contacted in line 1 with 284 b.p.s.d. of an aqueous stream to be specified hereinbelow which enters line 1 by means of line 14. The resulting mixture is introduced into condenser 2 wherein it is cooled to 130° F. and wherein ammonium chloride, ammonium polysulfides and other hydrocarbon insoluble constituents are dissolved or physically entrained in the water which is present. The effluent leaves via line 3 and enters a high pressure separator 4 at 675 p.s.i.g. wherein a hydrogen containing first gaseous vapor phase, a liquid hydrocarbon phase, and a first aqueous phase are separated. The first gaseous vapor phase including 348,000 s.c.f.d. of hydrogen sulfide leaves separator 4 via line 5 at the rate of $7.97 \times 10^6$ s.c.f.d. The first aqueous phase containing ammonium chloride and ammonium polysulfides leaves the bottom of separator 4 at the rate of 210 b.p.s.d. via line 7 and is split therein to provide 103 b.p.s.d. of water which leaves the process via line 7 and 107 b.p.s.d. which is withdrawn from line 7 by means of line 8 and is pressured into line 29 as will be discussed hereinbelow.

Leaving separator 4 at a pressure of 675 p.s.i.g. and containing substantial gas dissolved therein, the first liquid hydrocarbon phase passes through line 6 at the rate of 7501 b.p.s.d. and enters preheater 32 wherein it is heated to 330° F. The first hydrocarbon phase then passes through line 33 and enters the top of a stripping column 9 which is operated at a pressure of 95 p.s.i.g. Stripping steam at a temperature of 345° F. is injected into the bottom of column 9 by means of line 15 at the rate of 2015 pounds per hour. Steam, gases, and light hydrocarbon vapors leave stripping column 9 via line 10 at 335° F. and enter condenser 28, wherein the temperature is reduced to 110° F. The cooled stream passes through line 29, wherein additional water is injected by means of line 8 as discussed hereinabove, and the resulting mixture then enters receiver 12 by means of line 29. In receiver 12 a second gaseous vapor phase, a second liquid hydrocarbon phase, and a second aqueous phase are separated. The second gaseous vapor phase, including 241,000 s.c.f.d. of hydrogen sulfide and 10,700 s.c.f.d. of water vapor, leaves receiver 12, via line 13 at the rate of $0.84 \times 10^6$ s.c.f.d., and at a pressure of 85 p.s.i.g. It may, therefore, be sent without the means of a compressor unit directly into a fuel gas header or directly into a subsequent processing unit. The second hydrocarbon phase comprising propane, butanes and pentanes may leave receiver 12 via line 24 and be sent to subsequent processing as a preferred embodiment, but in the specific embodiment of this example, valve 25 remains closed and the second hydrocarbon phase is withdrawn in admixture with the second aqueous phase via line 14. The mixture comprises 74 b.p.s.d. of hydrocarbon and 210 b.p.s.d. of water, and this water consists of 107 b.p.s.d. cycled via line 8 as previously discussed and 103 b.p.s.d. recovered from the condensation of the stripping steam in condenser 28. The water-hydrocarbon phase is recycled via line 14 to line 1 wherein it is injected into the reactor effluent stream as the aqueous stream specified hereinabove.

An unstabilized diesel oil stream leaves stripping column 9 via line 11 at a temperature of 335° F. and at the rate of 7080 b.p.s.d., including 33 b.p.s.d. of water and 7047 b.p.s.d. of hydrocarbon. The stream passes through exchanger 34 wherein it is heated to 485° F. and it is introduced by means of line 35 into fractionating column 16 which is maintained at a pressure of about 10 p.s.i.g. Light hydrocarbon constituents are distilled overhead, leaving via line 17 at a temperature of 285° F. and entering condenser 30. Upon cooling to about 110° F., the condensed stream passes into receiver 18 by means of line 31 wherein a third liquid hydrocarbon phase, a third aqueous phase, and a third gaseous vapor phase are contained at a pressure of about 5 p.s.i.g. The third gaseous vapor phase is not a product of the fractionation, but is merely an inert gas blanket which is imposed upon the receiver in order to maintain a constant pressure upon the distillation effected within fractionator 16. The gas blanket enters and leaves receiver 18 via line 19 as a means of controlling pressure surges therein. The third aqueous phase leaves receiver 18 via line 21 at the rate of 33 b.p.s.d., and is discarded. It must be noted, however, that this water could also be recycled to the effluent in line 1, although this was not done in the specific embodiment discussed herein. The third hydrocarbon phase leaves via line 20 at the rate of 834 b.p.s.d. with 671 b.p.s.d. being returned via line 20 to fractionator 16 as reflux. The remaining 163 b.p.s.d. of the third hydrocarbon phase is withdrawn from line 20 via line 22 as a gasoline or naphtha boiling range product stream containing light hydrocarbon components comprising propane, butanes, and pentanes. The heavy hydrocarbon components of the diesel oil, including thermally unstable constituents, leave the bottom of fractionator 16 at a temperature of 595° F. via line 36 at a rate of 20,244 b.p.s.d. This stream is split in line 36 to provide 13,360 b.p.s.d. which remains in line 36 and enters reboiler 37 wherein the stream is heated to 605° F., which is below the level of thermal instability of the diesel oil. The heated stream then leaves reboiler 37 and enters fractionator 16 by means of line 38. The remaining portion of 6884 b.p.s.d. leaves line 36 via line 23 and consists of the final specification diesel oil product, having a flash point of 160° F. and an ASTM color of less than 1.5.

The embodiment presented in the foregoing example clearly illustrates the utility and advantages of the present invention. The thermally unstable diesel oil is fractionated at a pressure level which is low enough to assure that the temperature of distillation is below the level of thermal instability. The gas which is withdrawn from the process is sufficiently high in pressure so that compressor means is not required for its recovery. The temperature level of all environments wherein hydrogen sulfiide, water vapor, and other corrosive gaseous constituents are found, is low enough to allow the use of carbon steel and no expensive corrosion resistant alloys are required as material of construction in any part of the inventive process. The use of a steam stripping column to remove the gas and light vapor from the diesel oil provides a novel and useful source of the steam condensate which is used for washing the effluent condenser. The use of the steam stripping column also affords an effective means for the simultaneous recovery of light hydrocarbons comprising propane, butanes, and pentanes. Other advantages of the present invention are readily ascertainable by those skilled in the art of hydrocarbon processing.

It is apparent from the foregoing discussion that the term "thermal instability" as used herein refers to any degradation of product quality such as discoloration, both initially and aged, dehydrogenation, cracking, polymerization, etc. which is caused by subjecting the hydrocarbon in question to elevated temperature levels during non-catalytic processing.

It must be noted that although a diesel oil was processed in the embodiment illustrated herein, the process is equally applicable to the separation of a lubricating oil, a fuel oil, a kerosene, a gas oil, a reduced crude, a naphtha, or any blend of such hyddrocarbon fractions. It must be also noted that the present invention is not only applicable to the hydrogen treating of hydrocarbons, but that it is equally advantageous to utilize the inventive process where hydrocracking is specifically undertaken upon the hydrocarbon feed stock. In such an instance it would be most advantageous to recover the propane, butane and pentanes produced by withdrawing them from receiver 12 via line 24 as previously noted. It must be further realized that the diesel oil of the illustrative embodiment did not produce a high concentration of hydrocarbon insoluble constituents in the reactor effluent and that the first aqueous phase leaving separator 4 was low in such constituents. Therefore, in order to provide injection of steam condensate into line 1 at a nominal rate of three volume percent while conserving steam condensate, the circulation of part of the first aqueous phase via line 8 was undertaken. It must be realized that where the level of hydrocarbon insoluble constituents is higher, the rate of circulation of water through line 8 may of necessity, be reduced and the injection of additional clean steam condensate into line 1 may be required. It must be further noted that although the stripping column of the example was operated at a pressure of about 95 p.s.i.g. using 150 p.s.i.g. steam to provide a stripping temperature of 335° F., the operating pressure and stripping temperature are specific only to the example and that the operating conditions must be necessarily dependent upon the boiling range of the hydrocarbon being processed, the pressure of the gas recovery system, and the temperature at which the thermally unstable constituents begin to decompose. Those skilled in the art will readily ascertain the changes in operating conditions which may be necessary to effect the separation required for any specific hydrocarbon fraction. Similarly, the distillation which was effected in fractionator 16 was undertaken at a pressure of about 10 p.s.i.g., but such fractionation may be undertaken under a vacuum or under a higher pressure provided that the temperature of fractionation is below the level of thermal instability of the hydrocarbon being processed. Such modifications or adaptations of the illustrative embodiment should in no way be construed to detract from the broadness of the present invention.

I claim as my invention:

1. Process for separation of an effluent from a reaction zone wherein a hyddrocarbon charge stock has been contacted with a gaseous reactant, said effluent containing constituents subject to thermal degradation, corrosive normally gaseous constituents, and hydrocarbon insoluble constituents, which comprises the steps of:
   (a) injecting a hereinafter specified aqueous stream into the effluent leaving said reaction zone and passing the resulting first mixture into a separator wherein a first aqueous phase containing said hydrocarbon insoluble constituents, a first hydrocarbon phase, and a first gaseous vapor phase are separated;
   (b) withdrawing from the separator said first aqueous phase and said first gaseous vapor phase containing a portion of said corrosive constituents;
   (c) passing said first hydrocarbon phase from the separator to a stripping column wherein steam is injected as a stripping medium at a temperature below the level of sensitivity of said thermally unstable constituents;
   (d) removing from the stripping column an overhead stream consisting essentially of gases, steam, propane, butane, and pentane, and collecting the resulting second mixture in an overhead receiver under conditions sufficient to separate said mixture into a second gaseous vapor phase, a second hydrocarbon phase and a second aqueous phase;
   (e) withdrawing said second hydrocarbon phase and withdrawing said second gaseous vapor phase containing substantially all of the remaining corrosive constituents as a product stream;
   (f) recycling at least a portion of said second aqueous phase from the receiver and into the effluent as hereinabove specified;
   (g) removing a hydrocarbon stream comprising said thermally unstable constituents from the stripping column and passing said hydrocarbon stream to subsequent distillation means wherein the operating pressure is maintained at a level sufficient to provide that the temperature of distillation is below the level of thermal instability of said constituents; and,
   (h) withdrawing from said distillation means a hydrocarbon product comprising said thermally unstable constituents.

2. The process of claim 1 wherein a portion of said first aqueous phase is recycled to said effluent as hereinabove specified.

3. The process of claim 1 wherein at least a portion of said second hydrocarbon phase is injected into said effluent.

4. The process of claim 1 wherein said gaseous reactant comprises hydrogen.

5. The process of claim 1 wherein a portion of said first aqueous phase is passed to said stripper overhead receiver.

6. Process for separation of an effluent from a reaction zone wherein a hydrocarbon charge stock has been contacted with a gaseous reactant, said effluent containing hydrocarbon insoluble constituents and corrosive normally gaseous constituents, which comprises the steps of:
   (a) injecting a hereinafter specified aqueous stream into the effluent leaving said reaction zone and passing the resulting first mixture into a separator wherein a first aqueous phase containing said hydrocarbon insoluble constituents, a first hydrocarbon phase, and a first gaseous vapor phase are separated;
   (b) withdrawing from the separator said first aqueous phase and said first gaseous vapor phase containing a portion of said corrosive constituents;
   (c) passing said first hydrocarbon phase from the separator to a stripping column wherein steam is injected as a stripping medium;
   (d) removing from the stripping column an overhead stream consisting essentially of gases, steam, propane, butane, and pentane, and collecting the resulting second mixture in an overhead receiver at conditions sufficient to separate said mixture into a second gaseous vapor phase, a second hydrocarbon phase, and a second aqueous phase;
   (e) withdrawing said second hydrocarbon phase and withdrawing as a product stream said second gaseous-vapor phase containing substantially all of the remaining corrosive constituents;
   (f) withdrawing said second aqueous phase from the receiver and recycling at least a portion of said phase into the effluent as hereinabove specified; and,
   (g) removing a third hydrocarbon stream from the bottom of the stripping column as a product stream.

7. The process of claim 6, wherein a portion of said first aqueous phase is recycled to said effluent as hereinabove specified.

8. The process of claim 6, wherein at least a portion of said second hydrocarbon phase is injected into said effluent.

9. The process of claim 6, wherein said gaseous reactant comprises hydrogen.

10. The process of claim 6, wherein a portion of said first aqueous phase is passed to said overhead receiver.

References Cited

UNITED STATES PATENTS 3,356,608  12/1967  Franklin _____ 208—254

DELBERT E. GANTZ, Primary Examiner

G. J. CRASANAKIS, Assistant Examiner

U.S. Cl. X.R.

208—103, 212, 254, 363